United States Patent
Singer et al.

(10) Patent No.: US 12,499,280 B2
(45) Date of Patent: Dec. 16, 2025

(54) INTEGRATED-CIRCUIT MEMORY DUMP USING HARDWARE SECURITY MECHANISM

(71) Applicant: MELLANOX TECHNOLOGIES, LTD., Yokneam (IL)

(72) Inventors: Alon Singer, Tel Aviv (IL); Zachy Haramaty, Ramat Gan (IL)

(73) Assignee: Mellanox Technologies, Ltd, Yokneam (IL)

( * ) Notice: Subject to any disclaimer, the term of this patent is extended or adjusted under 35 U.S.C. 154(b) by 456 days.

(21) Appl. No.: 18/309,839

(22) Filed: May 1, 2023

(65) Prior Publication Data

US 2024/0370592 A1 Nov. 7, 2024

(51) Int. Cl.
*G06F 21/60* (2013.01)
*G06F 21/78* (2013.01)

(52) U.S. Cl.
CPC ............ *G06F 21/78* (2013.01); *G06F 21/604* (2013.01)

(58) Field of Classification Search
CPC ................................ G06F 21/78; G06F 21/604
USPC ............................................................ 726/26
See application file for complete search history.

(56) References Cited

U.S. PATENT DOCUMENTS

| | | | | |
|---|---|---|---|---|
| 5,596,739 A * | 1/1997 | Kane | ................... | G06F 12/1491 711/163 |
| 7,278,030 B1 * | 10/2007 | Chen | ................... | G06F 12/1466 711/201 |
| 7,493,498 B1 * | 2/2009 | Schmidt | ............... | G06F 12/1483 713/193 |
| 8,555,015 B2 * | 10/2013 | Muchsel | ............. | G06F 12/1491 726/28 |
| 2003/0084256 A1 * | 5/2003 | McKee | ............... | G06F 12/1491 711/206 |
| 2006/0288235 A1 * | 12/2006 | Goto | .................... | G06F 12/1491 713/190 |
| 2009/0172409 A1 | 7/2009 | Bullis et al. | | |
| 2010/0106954 A1 * | 4/2010 | Muchsel | ............. | G06F 12/1491 380/46 |
| 2013/0007379 A1 * | 1/2013 | Kegel | ..................... | G06F 21/78 711/E12.001 |
| 2013/0282951 A1 * | 10/2013 | Kuo | ..................... | G06F 11/0712 711/163 |
| 2015/0113240 A1 * | 4/2015 | Abrams | .............. | G06F 12/1458 711/163 |

(Continued)

OTHER PUBLICATIONS

Woo et al., "A Secure Scan Architecture Protecting Scan Test and Scan Dump Using Skew-Based Lock and Key", IEEE Access, vol. 9, pp. 102161-102176, year 2021.

(Continued)

*Primary Examiner* — Thanh T Le
(74) *Attorney, Agent, or Firm* — Meitar Patents Ltd.; Daniel Kligler

(57) ABSTRACT

A device includes multiple registers, multiple hardware-implemented Privilege Level Indicators (PLIs), and one or more circuits. The registers are to store respective values. The PLIs are to specify privilege levels for accessing the respective registers. The one or more circuits are to perform a secure memory dump operation including (i) checking the PLIs of one or more of the registers and (ii) outputting the values of the registers that are permitted for outputting according to the respective PLIs.

12 Claims, 4 Drawing Sheets

(56) References Cited

U.S. PATENT DOCUMENTS

| | | | |
|---|---|---|---|
| 2016/0110298 A1* | 4/2016 | Koufaty | G06F 21/52 |
| | | | 726/28 |
| 2017/0228535 A1* | 8/2017 | Shanbhogue | G06F 21/52 |
| 2017/0293581 A1* | 10/2017 | Villatel | G06F 21/78 |
| 2019/0034654 A1* | 1/2019 | Parker | G06F 21/6218 |
| 2020/0210197 A1* | 7/2020 | Asanovic | G06F 9/3842 |
| 2020/0304464 A1* | 9/2020 | Mundra | H04L 63/0218 |
| 2021/0051149 A1* | 2/2021 | Huntley | H04L 63/1433 |
| 2021/0303385 A1 | 9/2021 | Almog et al. | |
| 2024/0078113 A1* | 3/2024 | Shanbhogue | G06F 9/323 |
| 2024/0296122 A1* | 9/2024 | Milburn | G06F 12/1009 |

OTHER PUBLICATIONS

Wikipedia, "Advanced extensible Interface," pp. 1-8, last updated Mar. 7, 2023.
CXL Consortium, "CXL™ Consortium Releases Compute Express Link™ 2.0 Specification", Press Release, pp. 1-2, Nov. 10, 2020.
NVIDIA Corporation, "NVIDIA Opens NVLink for Custom Silicon Integration", Press release, pp. 1-2, Mar. 22, 2022.

\* cited by examiner

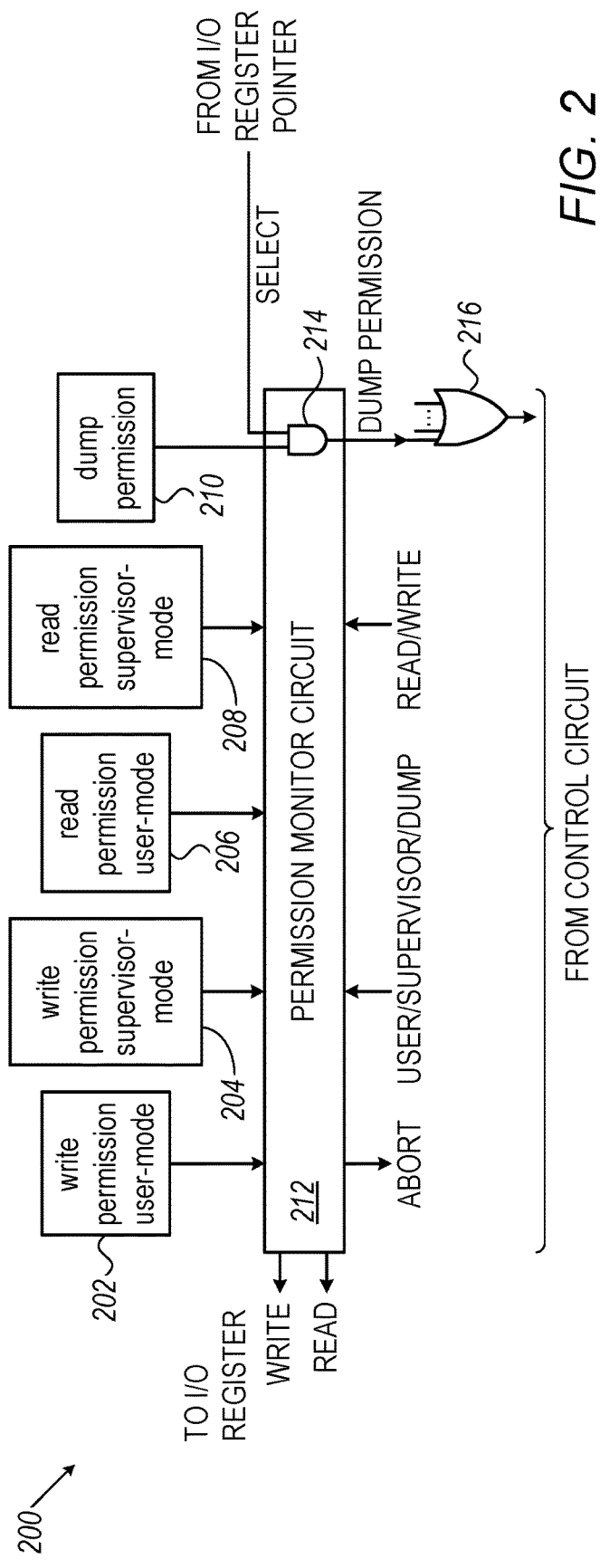
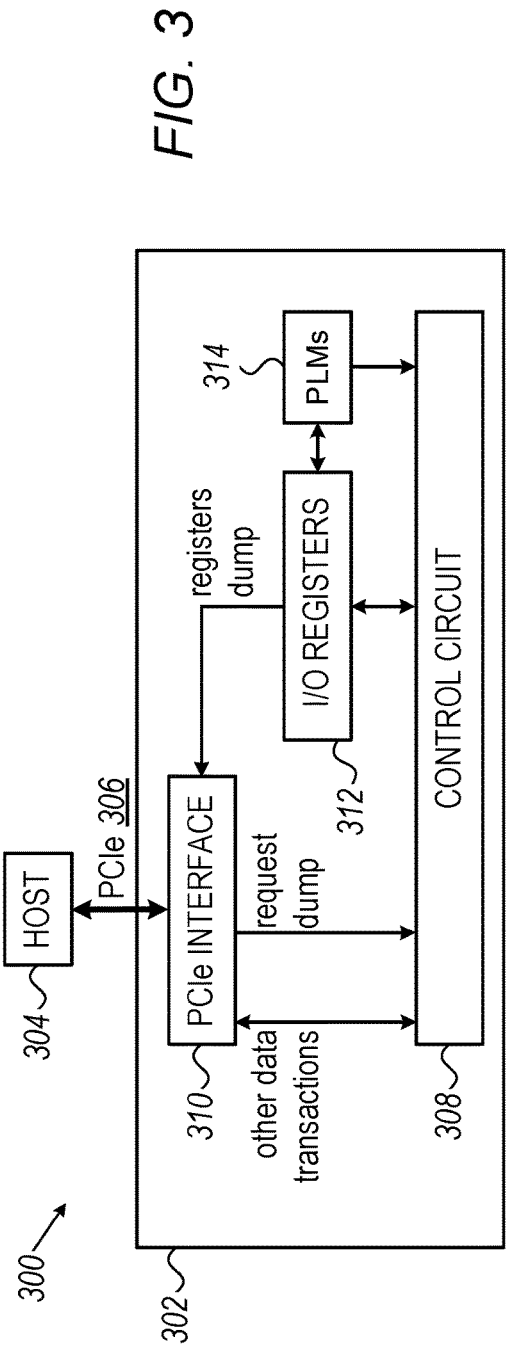

INTEGRATED-CIRCUIT MEMORY DUMP USING HARDWARE SECURITY MECHANISM

FIELD OF THE INVENTION

The present invention relates generally to integrated circuits (ICs), and particularly but not exclusively to secure dump of registers in an IC.

BACKGROUND OF THE INVENTION

When an Integrated Circuit (IC) such as a System on Silicon (SoC), or a system comprising an IC is analyzed, a user may dump the contents of the IC registers; such dump, however, should not reveal any confidential data.

In "A Secure Scan Architecture Protecting Scan Test and Scan Dump Using Skew-Based Lock and Key", Woo et. al. IEEE Access, Volume 2, 2021, the authors assert that, while Scan-based Design for Testability (DFT) is widely used in the industry, consistently providing high fault coverage, scan-based DFT is prone to security vulnerabilities where attackers use the scan design to obtain secret information from the system-on-chip. Some countermeasures for such attacks contribute to enhancing the security of the scan design but lose some debuggability. The authors propose a secure scan architecture using a skew-based lock and key to enhance the security of the scan design while maintaining the debuggability of the scan dump.

U.S. Patent Application Publication 2009/0172409 addresses address deficiencies of the art in respect to core dump generation during application fault handling and provide a method, system and computer program product for privacy preservation of core dump data during application fault handling. A method for privacy preservation of core dump data during application fault handling is provided. The method can include receiving a crash signal for an application and generating a core dump with object data for the application. The method further can include obfuscating the object data in the core dump and writing the core dump with obfuscated object data to a file. In this way, the privacy of the object data in the core dump can be preserved.

SUMMARY OF THE INVENTION

An embodiment of the present invention that is described herein provides a device including multiple registers, multiple hardware-implemented Privilege Level Indicators (PLIs), and one or more circuits. The registers are to store respective values. The PLIs are to specify privilege levels for accessing the respective registers. The one or more circuits are to perform a secure memory dump operation including (i) checking the PLIs of one or more of the registers and (ii) outputting the values of the registers that are permitted for outputting according to the respective PLMs.

In some embodiments, the secure memory dump operation is assigned a privilege level, and the one or more circuits are to output only the values of the registers whose PLIs do not exceed the privilege level of the secure memory dump operation. In an embodiment, the one or more circuits are to output the values by sending the values over a peripheral bus to a host.

In some embodiments, the one or more circuits include a processor having an Instruction Set Architecture (ISA) including a command that checks a privilege level of a register, and the one or more circuits are to check the PLIs of the one or more of the registers by executing the command. In an embodiment, in executing the command, the processor is to determine an identity of the register whose PLM is to be checked by reading another register.

In an example embodiment, the registers include one or more destructive-read registers whose access modifies a state of the device, and the PLIs define that the destructive-read registers are not permitted for outputting by the secure memory dump operation. In an embodiment, in performing the secure memory dump operation, the one or more circuits are to output only the values of the registers that are permitted for outputting according to the respective PLIs.

There is additionally provided, in accordance with an embodiment that is described herein, a method including storing multiple values is respective registers of a device. Privilege levels, for accessing the respective registers, are specified in multiple hardware-implemented Privilege Level Masks (PLIs) in the device. A secure memory dump operation is performed, including (i) checking the PLIs of one or more of the registers and (ii) outputting the values of the registers that are permitted for outputting according to the respective PLIs.

The present invention will be more fully understood from the following detailed description of the embodiments thereof, taken together with the drawings in which:

BRIEF DESCRIPTION OF THE DRAWINGS

FIG. 2 is a block diagram that schematically illustrates a Protection Level Mask (PLM) circuit, in accordance with an embodiment of the present invention;

FIG. 3 is a block diagram that schematically illustrates host-SoC Register dump over a Peripheral Component Interconnect Express (PCIe) system bus, in accordance with an embodiment of the present invention;

DETAILED DESCRIPTION OF EMBODIMENTS

Overview

Figure 1:
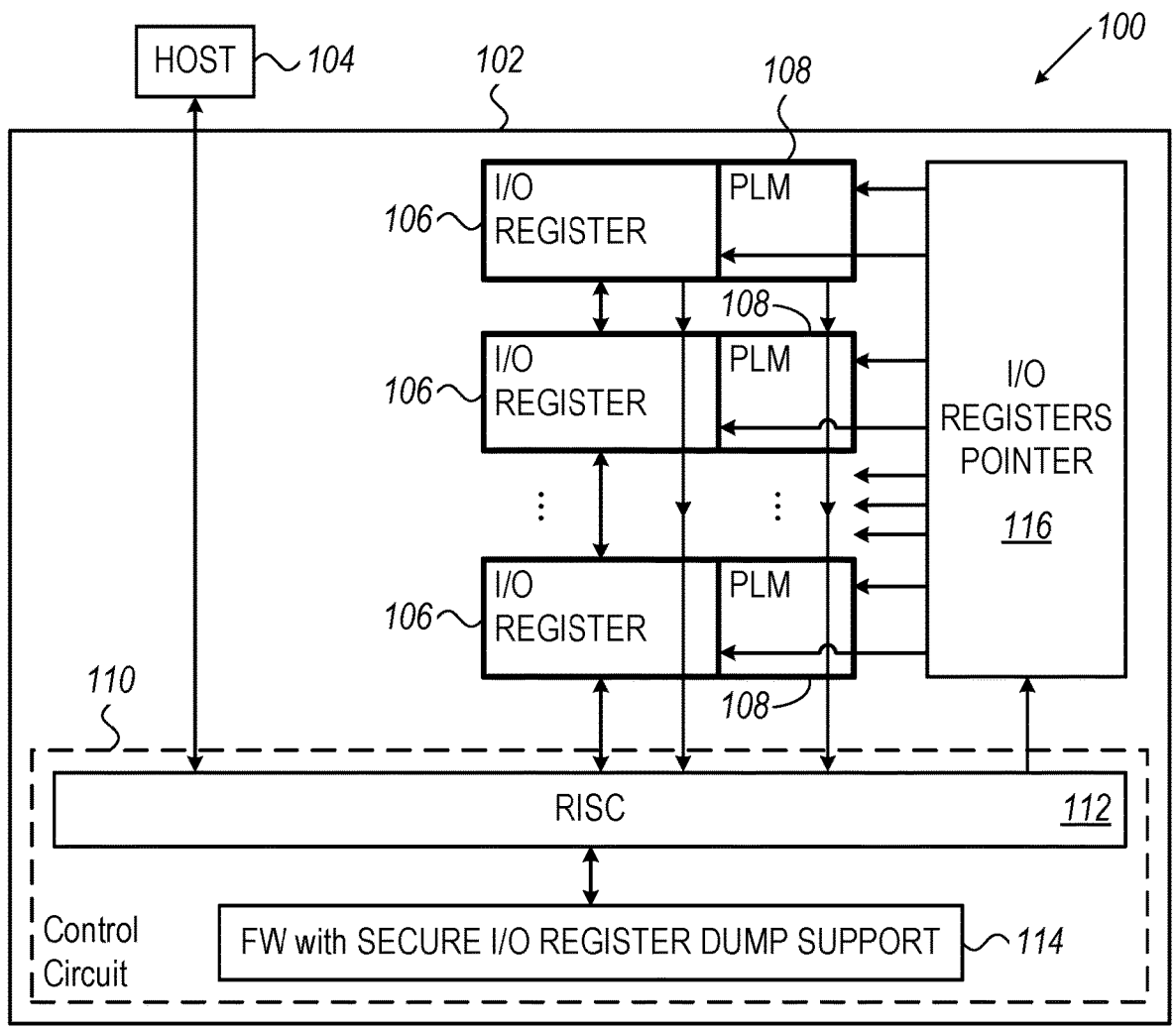
FIG. 1 is a block diagram that schematically illustrates a safe I/O Registers dump in a computer system, in accordance with an embodiment of the present invention.

A register dump, also known as a core dump or memory dump, is a process of copying the contents of a memory and/or of registers into a file or storage device. This is typically done for troubleshooting purposes or to analyze system crashes.

In the description hereinbelow, the phrase "dumping of register content" is sometimes referred to simply as "dumping of a register". Similarly, the content of a register is sometimes referred to simply as the register. Performing a register dump can pose security risks, as the registers may contain sensitive information such as passwords, personal data, or encryption keys. If an attacker gains access to a register dump, the attacker could potentially use this information to exploit vulnerabilities in the system or gain unauthorized access.

In the description below we will refer mainly to I/O Register dump in System on a Chip (SoC) systems, by way of example. The disclosed techniques, however, are not limited to SoC and can be used in any other suitable IC or other device.

Embodiments of the present invention that are disclosed herein provide for effective and safe I/O Register dump, wherein the protection setting of each I/O Register to be dumped is checked before the I/O Register is accessed. In disclosed embodiments, an SoC comprises a set of registers. A corresponding set of Protection Level Indicators (PLIs) in the SoC protect sensitive I/O Registers against unauthorized access; for example, when software attempts to read a protected I/O Register, a respective PLI may abort the operation so that the I/O Register is not accessed. However, this solution may significantly slow down the dump operation.

In the embodiments disclosed below, the Privilege Level Indicators comprise hardware-implemented masks referred to as Privilege Level Masks (PLMs); the disclosed techniques, however, are not limited to privilege level masks, and any other suitable privilege indicator type may be used in alternative embodiments.

Privilege Level Masks are also referred to as Protection Level Masks hereinbelow; (both terms having the same PLM acronym).

In embodiments, the SoC comprises a Control Circuit, which is configured to check the PLM setting of I/O Registers that are to be dumped, and to avoid dumping the protected I/O Registers. In an embodiment, the Instruction Set Architecture (ISA) of a processor (e.g., a Reduced Instruction Set Computer-RISC) in the Control Circuit instruction; in supports a I/O-Register-Dump some embodiments the I/O-Register-Dump instruction defines the address range of the I/O Registers to be dumped (e.g., sets a Start and an End address). Responsively to the I/O-Register-Dump instruction, the Control Circuit sequentially checks the PLMs that correspond to all I/O Registers within the specified range and dumps only the I/O Registers that are not protected by corresponding PLMs.

In other embodiments, the Control Circuit reads the contents of the PLMs using a PLM-Control Circuit interface register. For example, the Control Circuit may send an I/O Register address and receive the corresponding PLM contents through dedicated registers.

In embodiments, a host (e.g., a Central Processing Unit-CPU) requests an I/O Register dump and receives the dump data over a system bus (also referred to as a peripheral bus), e.g., a Peripheral Component Interconnect express (PCIe). The SoC comprises a suitable system-bus interface, facilitating communication between the Control Circuit and the host.

Lastly, reading some of the I/O Registers may change their values. For example, some I/O Registers may be configured to count the number of times in which they are read; for another example, some I/O Registers may be used as semaphores; reading those I/O Registers may signal a cleared semaphore and disrupt inter-process synchronization. In embodiments, some or all the PLMs comprise a destructive-read protection bit, protecting the respective I/O Registers from being read during I/O Register dump.

System Description

FIG. 1 is a block diagram that schematically illustrates a computer system 100 supporting a safe I/O Registers dump, in accordance with an embodiment of the present invention.

A System on a Chip (SoC) 102 communicates with a Host 104 such as a Central Processing Units (CPU) during a SoC analysis session. The SoC comprises a set of I/O Registers 106, some of which may store sensitive data such as passwords or encryption keys. A set of protection level indicators (PLIs), in the present example Protection Level Mask (PLM) circuits, are coupled to the I/O Registers, each PLM circuit defining a protection level for the corresponding I/O Register.

SoC 102 further comprises a Control Circuit 110, which is configured to facilitate I/O Register access, including I/O Register dump. According to the example embodiment illustrated in FIG. 1, the Control Circuit comprises a Reduced-Instruction-Set Computer (RISC) 112, and a firmware 114. The firmware is typically stored in a memory, comprising volatile and non-volatile portions. According to the example embodiments described hereinbelow, the RISC may be in User or Supervisor mode. Other terminology and/or additional modes may be used in alternative embodiments, e.g., superuser, administrator, and others.

Control Circuit 110 accesses I/O Registers 106 for read and write operations, including I/O Register dump. The RISC sends the register address to an I/O Registers Read Pointer 116, which selects an I/O Register and the corresponding PLM. The PLM may disallow the access if the access privilege is insufficient. For example, if the PLM that corresponds to a given I/O Register allows read only when the RISC is in Supervisor mode, the PLM will not allow the RISC to access the I/O Register when the RISC is in User mode. In an embodiment, the PLM registers may abort the Control Circuit operation (e.g., by asserting an Abort input of the RISC) in response to an I/O Register access with insufficient privilege.

To dump the I/O Registers—the full set or a subset thereof—the Host typically sends a request to the Control Circuit, which, in turn, reads the respective I/O Registers and dumps the I/O Registers to the host.

According to the example embodiment illustrated in FIG. 1 and described herein, the RISC processor, for every I/O Register to be dumped, reads the corresponding PLM setting but does not read the I/O Register. Only if the PLM setting allows access of the I/O register, the RISC will read the I/O Register and dump the I/O Register to the host. Thus, the delays involved with accessing an I/O Register with insufficient privilege (e.g., Abort handling time) will be saved.

The configuration of computer system 100 illustrated in FIG. 1 and described hereinabove is an example that is cited for the sake of conceptual clarity. Other embodiments may be used in alternative embodiments. For example, in some embodiments some PLMs may define privilege level for a group of I/O Registers, e.g., I/O Registers that share some of the address bits, or I/O Registers located in a logic partition. In embodiments, the Control Circuit communicates with the PLMs and the I/O Registers over a shared bus; in an embodiment, the shared bus is also output to the CPU. In another embodiment, the Host communicates with the SoC via a high-speed system bus.

FIG. 2 is a block diagram that schematically illustrates a Protection Level Mask circuit 200, in accordance with an embodiment of the present invention. The PLM communicates with Control Circuit 110 and with a respective I/O Register 106 (FIG. 1).

According to the example embodiment illustrated in FIG. 2, the PLM comprises a Write-Permission-User-Mode register 202, a Write-Permission-Supervisor-Mode register 204, a Read-Permission-User-Mode register 206, a Read-Permission-Supervisor-Mode register 208, and a Dum-Permission register 210. Each of registers 202 through 210 allows, when set, access to the respective I/O Register at the designated mode and the operation (read/write) type. For example, if Write-Permission-Supervisor-Mode register 204 is set, the PLM will allow the RISC, when in Supervisor mode, to write the respective I/O Register.

A Permission Monitor circuit 212 control accesses of the Control Circuit to the I/O Register. The Permission Monitor circuit receives an Operation Mode and an Access-Type indication from the Control Circuit; according to the example embodiment illustrated in FIG. 2, the Operation Mode may be one of User, Supervisor or Dump, whereas the access type may be one of Read or Write (in other embodiments, different operation modes may be used; in an embodiment, the operation mode is User or Supervisor only, and the operation type is Read, Write or Dump).

Responsively to the Operation Mode, the Access-Type and the contents of a corresponding permission register (one of 202, 204, 206, 208 and 210), the Permission-Monitor circuit may send a Read or a Write indication to the respective I/O Register. If the access is not allowed, the Permission Monitor circuit will refrain from sending a Read or a Write indication and, instead, send an Abort indication to the Control Circuit (typically to the RISC).

To avoid the Abort overhead, Permission Monitor circuit 212 is configured to send the contents of Dump Permission register 210 to the Control Circuit. When the Control Circuit sends the address of an I/O Register to I/O Register Pointer 116 (FIG. 1), the I/O Register Pointer send a Select indication to the corresponding PLM. An AND gate 214 ands the contents of the Dump-Permission Register with Select signal, generating a Dump-Permission output. The Dump-Permission output of a group (or all) the PLMs are wired to an OR gate 216. The combination of AND gates 214 and OR gate 216 form a multiplexer, which sends the content of the dump-permission Register 210 of the selected PLM to the Control Circuit. Thus, by reading the contents of the Dump Permission Register prior to dumping the respective I/O register, the Control Circuit can avoid an Abort if the access is not permitted.

The configuration of PLM 200 illustrated in FIG. 2 and described hereinabove is cited by way of example. Other configurations may be used in alternative embodiments. For example, in some embodiments, AND gates 214 are open-drain gates configured to conditionally pull-down at a first clock phase, and OR gate 216 is a wired-OR gate that pulls the input high at a second clock phase. In embodiments, de-morgan equivalents of the AND and OR gates are used.

In some embodiments, there is no Dump Permission Register—the permission of the Dump is the same as that of a Read operation, and AND gate 214 is configured to And the contents of the Read-Permission-Supervisor-Mode Register 208 (assuming dump is aways done at Supervisor mode).

The memory dump operation in which the dump of protected registers is disabled via the use of PLIs will be referred to hereinbelow as Secure Memory Dump.

FIG. 3 is a block diagram 300 that schematically illustrates host-SOC Register dump over a Peripheral Component Interconnect Express (PCIe) system bus, in accordance with an embodiment of the present invention.

An SoC 302 communicates with a Host 304 (e.g., a CPU) over a PCIe system bus 306, also referred to herein as a peripheral bus. The SoC comprises a Control Circuit 308 (e.g., a RISC processor), a PCIe Interface 310 for communicating over the PCIe bus, a I/O-Registers circuit 312 and a PLMs circuit 314. The Host and the Control Circuit may communicate in a variety of transaction types. When the host needs a I/O Register dump, the host sends a respective message to the Control Circuit over the PCIe bus and through PCIe Interface 310. The Control Circuit, responsively, for each I/O Register to be dumped, checks the corresponding PLM and if a Dump access is allowed, sends the I/O Register, through the PCIe Interface and over the PCIe bus, to the host (according to the example embodiment illustrated in FIG. 3, rather than reading the I/O Registers and then forwarding the read data to the PCIe interface, the Control Circuit controls the I/O Registers to dump the I/O registers directly to the PCIe interface).

The configuration of SoC 302 and Host 304, illustrated in FIG. 3 and described hereinabove, is an example that is cited merely for the sake of conceptual clarity. Other configurations may be used in alternative embodiments. For example, in an embodiment, other suitable system buses may be used instead of PCIe bus 306, e.g., an Advanced Extensible Interface (AXI), Compute Express Link (CXL), Nvlink or Nvlink Chip-to-Chip (Nvlink-C2C) bus.

Figure 4:
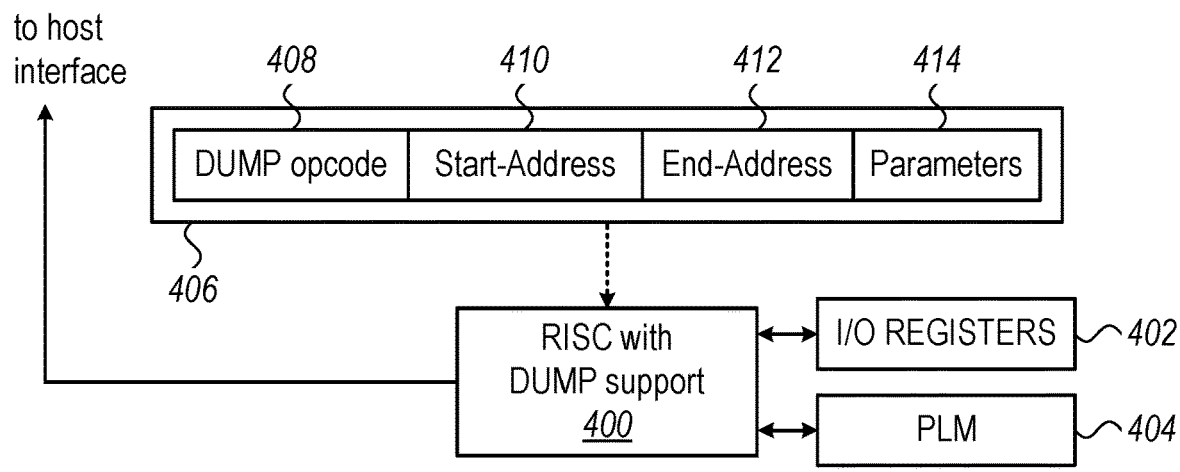
FIG. 4 is a block diagram that schematically illustrates the Instruction Set Architecture (ISA) of a processor in a control circuit, in accordance with an embodiment of the present invention.

FIG. 4 is a block diagram that schematically illustrates the Instruction Set Architecture (ISA) 400 of a processor in a Control Circuit, in accordance with an embodiment of the present invention. The Control Circuit comprises a processor (e.g., RISC 112, FIG. 1), and comprises I/O Registers 402 and PLMs 404.

To support secure I/O Register dump, the ISA of the RISC is configured to recognize a Dump Registers instruction 406 and, responsively, to dump the I/O Registers. The ISA instruction comprises a DUMP Opcode field 408, which specifies a unique Dump opcode, a Start Address field 410, which specifies the address of the first I/O Register to be dumped, an End-Address field 412, which specifies the address of the last I/O Register to be dumped, and, optionally, a Parameters field 414. The optional Parameters field may indicate for example, the data to be dumped instead of the protected I/O Registers. In some embodiments the End-Address field is replaced by a Dump-Length field.

When RISC 400 receives a Dump Registers instruction from a host (through a host-interface), the RISC will enter a loop wherein the RISC, for every I/O Register, starting with the specified first I/O Register and ending with the last I/O Register, checks the respective PLM and, accordingly, sends or does not send the I/O Register to the host (through the host-interface).

The configuration of ISA 400 illustrated in FIG. 4 and described above is cited by way of example. Other configurations may be used in alternative embodiments. For example, in an embodiment, the instruction encoding may include skip ranges of I/O Registers which are not to be dumped.

In some embodiments the Control Circuit examines the privilege level of the I/O Registers to be dumped using dedicated registers that are written and read by the Control Circuit.

Figure 5:
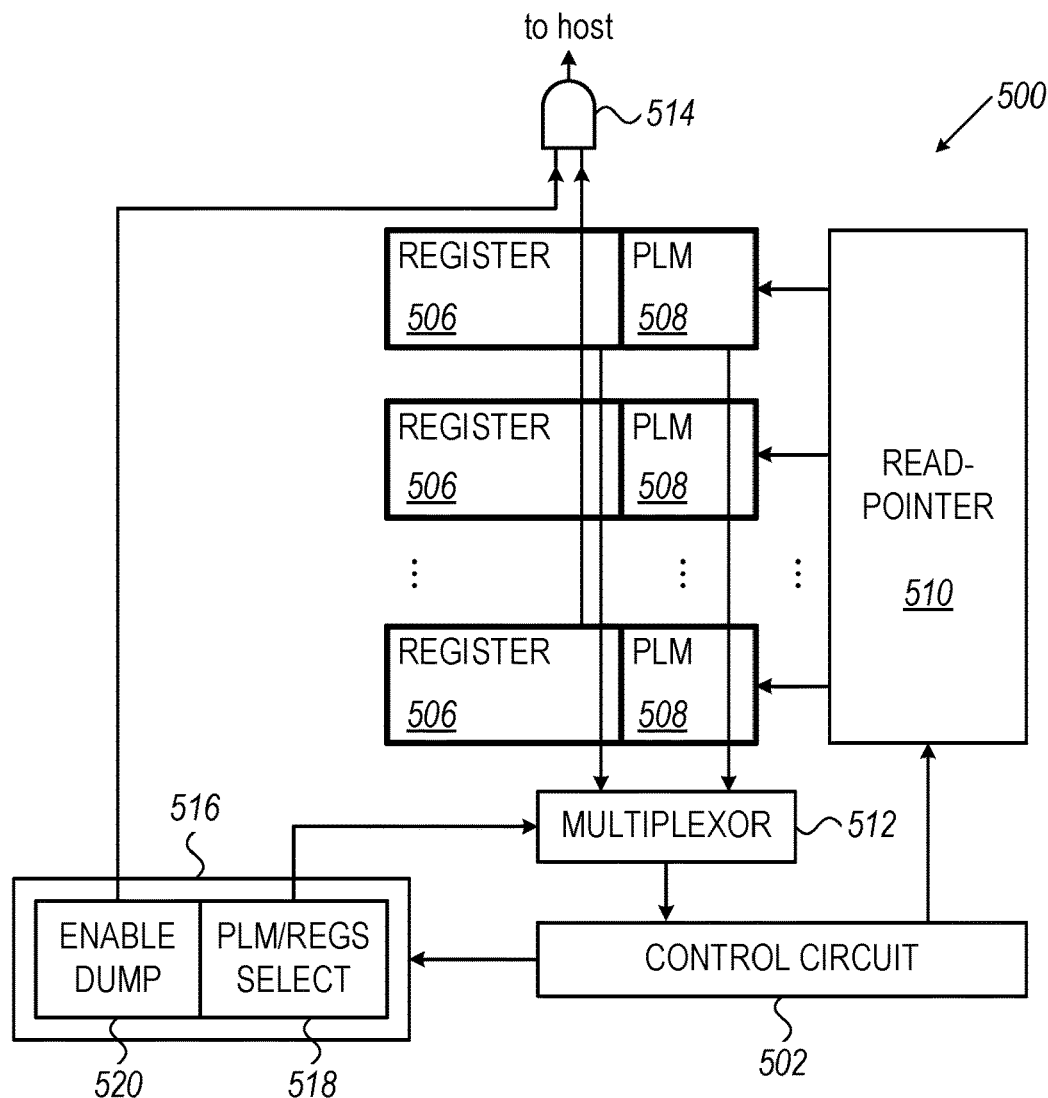
FIG. 5 is a block diagram that schematically illustrates a SoC, in accordance with an embodiment of the present invention.

FIG. 5 is a block diagram that schematically illustrates a SoC 500, in accordance with an embodiment of the present invention. A Control Circuit 502 is configured to securely dump some or all of I/O Registers 506, which are protected by PLMs 508. Control circuit 502 selects an I/O Register and a corresponding PLM through a Read-Pointer 510. A Multiplexor 512 then, responsively to a Selection input, selects the data that the Control Circuit reads, between the I/O Registers and the respective PLM. An AND gate 514 allows or blocks the dump of the I/O Registers to the host.

To control I/O Registers dump, SoC 500 further comprises a Dump-Control Register 516. According to the example embodiment illustrated in FIG. 5, Dump-Control Register 516 comprises two bits-a PLM/Regs bit 518, which sets Multiplexor 512 input selection (between the I/O registers and the PLMs), and an Enable DUMP bit 520, which is configured to control AND gate 514.

To dump I/O Registers, the Control Circuit, for every I/O Register to be dumped: (i) programs Dump-Control register 516 bit PLM/Regs Select 518 to select the PLMs and Enable-Dump bit 520 to logic-0 (thereby forcing AND gate 514 to an all-0 output); (ii) sends the address of the I/O Register to be dumped to Read-Pointer 510; (iii) reads the protection level of the I/O Register to be dumped from multiplexor 512; and, (iv) if the access privilege is sufficient-program Enable-Dump bit 520 of Dump-Control Register 516 to logic-1 thereby routing the I/O Register to be dumped to the host.

The configuration of SoC 500 illustrated in FIG. 5 and described hereinabove is cited by way of example. Other configurations in which the Control Circuit examines the privilege level of the I/O Registers to be dumped using dedicated registers may be used in alternative embodiments. For example, in some embodiments there is no multiplexor 512 and, instead, the Control Circuit is configured to read the PLMs and the I/O Registers on separate busses. In an embodiment, register 516 is an I/O Register, selected by Read-Pointer 510.

Figure 6:
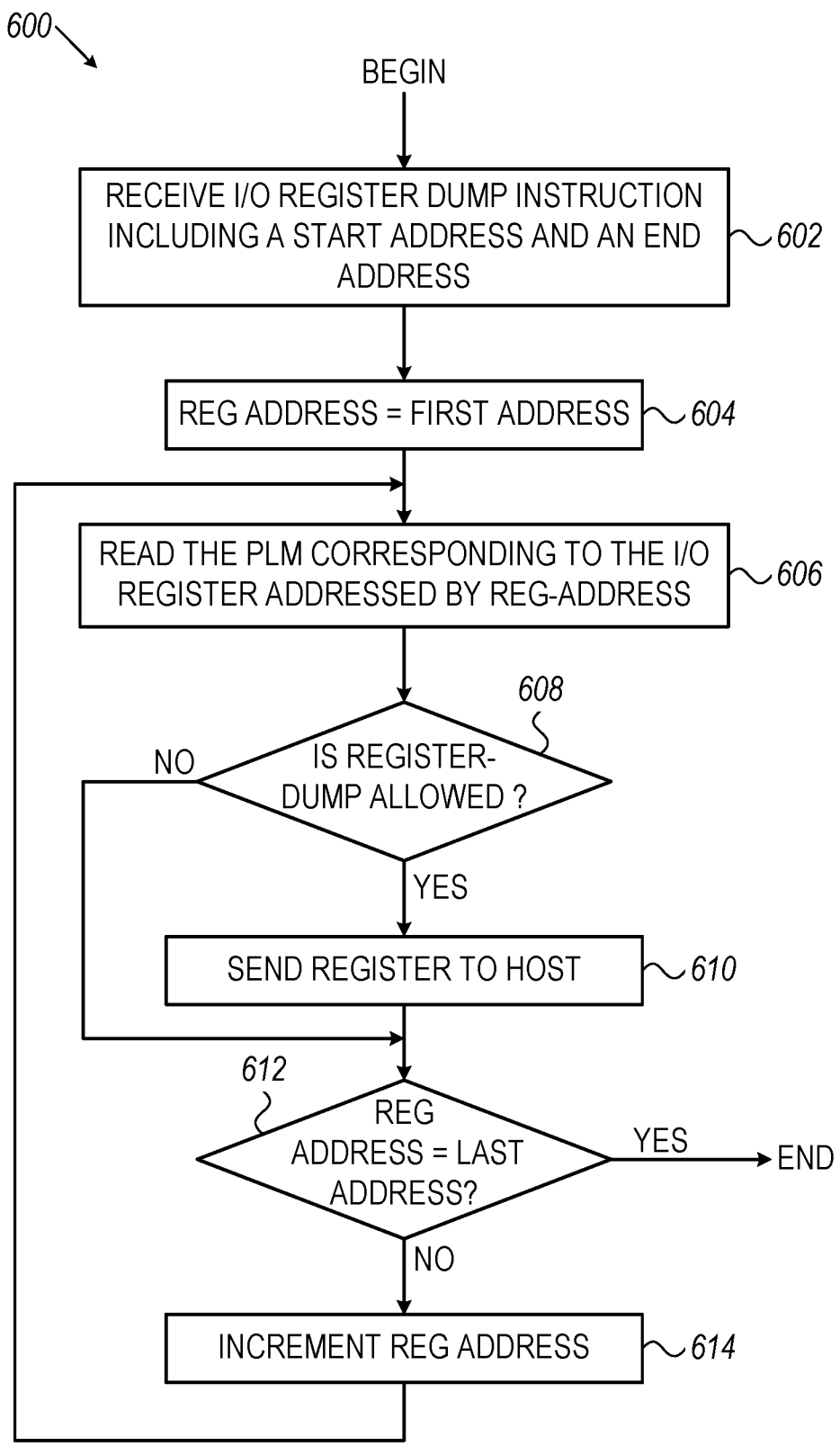
FIG. 6 is a flowchart that schematically illustrates a method for secure dump of I/O Registers, in accordance with an embodiment of the present invention.

FIG. 6 is a flowchart 600 that schematically illustrates a method for secure dump of I/O Registers, in accordance with an embodiment of the present invention. The flowchart is executed by Control Circuit 110 (FIG. 1).

The flowchart starts at a Receive I/O Register Dump Instruction operation 602, wherein the Control Circuit receives, from a Host, an instruction to dump the I/O Registers, from a Start address to an End address. In some embodiment, the Circuit Instruction Set Control Architecture (ISA) comprises a Dump Registers instruction, such as instruction 406 (FIG. 4); in other embodiments the I/O Register dump may be a call to a function or a subroutine that the Control Circuit executes, wherein the Start and End addresses are parameters. In an embodiment, the host sends parameters to define a Start address and, instead of an End address, a Dump Length.

The Control Circuit then, at a set REG ADDRESS operation 604, sets the value of a REG ADDRESS variable to the value of the Start-Address, and then enters a Read PLM operation 606, wherein the Control Circuit sends REG-ADDRESS to Read Pointer 510 (FIG. 5) and reads the PLM which corresponds to the selected I/O Register.

Next, at a Check-Dump-Allowed operation 608, the Control Circuit determines, according to the PLM contents, whether dumping of the I/O Register is allowed. If so, the Control Circuit enters a Send Register Contents operation 610, sends the I/O Register to the host and then enters a Check-Last Address operation 612. If, in operation 608, dumping the I/O Register is not allowed, the Control Circuit skips operation 610 and enters operation 612.

In Check-Last Address operation 612, the Control Circuit checks if REG ADDRESS variable is equal to the End Address parameter. If so, the flowchart ends. If the REG ADDRESS variable is not equal to the End Address parameter, the Control Circuit, at an Increment REG ADDRESS operation 614, increments the REG ADDRESS parameter to point at the next I/O Register, and then reenters operation 606.

The configuration of flowchart 600 illustrated in FIG. and described hereinabove is cited by way of example. Other configurations may be used in alternative embodiments. For example, in some operation, a single PLM may set the protection level for a contiguous group of I/O Registers, and the flowchart changes accordingly.

Destructive-Read I/O Registers

In some embodiments, reading of some of the I/O Registers may change the status of the SoC and, hence, should be avoided during I/O Register dump. Examples include an Access-Counter that increments whenever read, and a semaphore that synchronizes two processes. Such registers should be read during normal program flow (e.g., to read the number of accesses, or to synchronize two processes), but are typically not read during I/O Registers dump.

In embodiments, the PLM includes a destructive-read-protect flag, and will not be read during I/O register dump. In an embodiment, the Control Circuit can bypass the destructive read protect (e.g., by executing I/O Register Dump in Supervisor mode); thus, the destructive-read I/O Registers can be protected from I/O dump that is done during the course of program execution but can still be read if needed.

The configurations of SoC 100, Control Circuit 114, PLM 200 and Permission Monitor 212, ISA Register-Dump instruction 406, SoC 500 and the method of flowchart 600, illustrated in FIGS. 1 through 6 and described hereinabove, are example configurations and flowcharts that are shown purely for the sake of conceptual clarity. Any other suitable configurations and flowcharts can be used in alternative embodiments. The different sub-units of SoC 100 may be implemented using suitable hardware, such as in one or more Application-Specific Integrated Circuits (ASICs) or Field-Programmable Gate Arrays (FPGAs), using software, using hardware, or using a combination of hardware and software elements.

Although the embodiments described herein mainly address secure dumping of IC registers, the methods and systems described herein can also be used for memory dumping in other suitable devices and applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A device, comprising:
multiple registers, to store respective values;
multiple hardware-implemented Privilege Level Indicators (PLIs), to specify privilege levels for accessing the respective registers; and
one or more circuits, to perform a secure memory dump operation including (i) checking the PLIs of one or more of the registers and (ii) outputting the values of the registers that are permitted for outputting according to the respective PLIs, wherein the secure memory dump operation is assigned a privilege level, and wherein the one or more circuits are to output only the values of the registers whose PLIs do not exceed the privilege level of the secure memory dump operation.

2. The device according to claim 1, wherein the one or more circuits are to output the values by sending the values over a peripheral bus to a host.

3. The device according to claim 1, wherein the one or more circuits comprise a processor having an Instruction Set Architecture (ISA) comprising a command that checks a privilege level of a register, and wherein the one or more circuits are to check the PLIs of the one or more of the registers by executing the command.

4. The device according to claim 3, wherein, in executing the command, the processor is to determine an identity of the register whose PLI is to be checked by reading another register.

5. The device according to claim 1, wherein the registers comprise one or more destructive-read registers whose access modifies a state of the device, and wherein the PLIS define that the destructive-read registers are not permitted for outputting by the secure memory dump operation.

6. The device according to claim 1, wherein, in performing the secure memory dump operation, the one or more circuits are to output only the values of the registers that are permitted for outputting according to the respective PLIs.

7. A method, comprising:
storing multiple values in respective registers of a device;
specifying privilege levels, for accessing the respective registers, in multiple hardware-implemented Privilege Level Indicators (PLIs) in the device; and
performing a secure memory dump operation including (i) checking the PLIs of one or more of the registers and (ii) outputting the values of the registers that are permitted for outputting according to the respective PLIs,
wherein the secure memory dump operation is assigned a privilege level, and wherein outputting the values comprises outputting only the values of the registers whose PLIs do not exceed the privilege level of the secure memory dump operation.

8. The method according to claim 7, wherein outputting the values comprises sending the values over a peripheral bus to a host.

9. The method according to claim 7, wherein the device includes a processor having an Instruction Set Architecture (ISA) comprising a command that checks a privilege level of a register, and wherein checking the PLIs comprises checking the PLMs of the one or more of the registers by executing the command.

10. The method according to claim 9, wherein executing the command comprises determining an identity of the register whose PLI is to be checked by reading another register.

11. The method according to claim 7, wherein the registers comprise one or more destructive-read registers whose access modifies a state of the device, and wherein the PLIs define that the destructive-read registers are not permitted for outputting by the secure memory dump operation.

12. The method according to claim 7, wherein performing the secure memory dump operation comprises outputting only the values of the registers that are permitted for outputting according to the respective PLIs.

* * * * *